United States Patent
Bonanno et al.

(10) Patent No.: US 8,195,926 B2
(45) Date of Patent: Jun. 5, 2012

(54) METHOD AND SYSTEM FOR PURGING PATTERN HISTORY TABLES AS A FUNCTION OF GLOBAL ACCURACY IN A STATE MACHINE-BASED FILTERED GSHARE BRANCH PREDICTOR

(75) Inventors: James J. Bonanno, Wappingers Falls, NY (US); Brian R. Prasky, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 12/032,371

(22) Filed: Feb. 15, 2008

(65) Prior Publication Data

US 2009/0210686 A1    Aug. 20, 2009

(51) Int. Cl.
G06F 7/38 (2006.01)
G06F 9/00 (2006.01)
G06F 9/44 (2006.01)

(52) U.S. Cl. ........................ 712/239; 712/240

(58) Field of Classification Search ............... 712/239, 712/240
See application file for complete search history.

(56) References Cited

U.S. PATENT DOCUMENTS 5,901,307 A * 5/1999 Potter et al. ............ 712/240
5,933,628 A   8/1999 Chang
6,918,033 B1  7/2005 Cho
2005/0257036 A1 11/2005 Prasky et al.

OTHER PUBLICATIONS

Jimenez; "Code Placement for Improving Dynamic Branch Prediction Accuracy"; Jun. 2005; ACM; pp. 1-10.*
Scott McFarling, "Combining Branch Predictors", WRL Technical Note TN-36, Western Research Laboratory, Palo Alto, California, Jun. 1993.
Z/Architecture Principles of Operation, International Business Machines Ciorporation, SA22-7832-05, Sicth Edition (Apr. 2007).

* cited by examiner

Primary Examiner — Eddie P Chan
Assistant Examiner — William Partridge
(74) Attorney, Agent, or Firm — Cantor Colburn LLP; John Campbell

(57) ABSTRACT

A method, system and computer product for purging pattern history tables as a function of global accuracy in a state machine-based filter gshare branch predictor. An exemplary embodiment includes a method including storing a plurality of encountered branch instructions in the branch history table, indexing the branch history table by a branch instruction address, modifying an entry of the branch history table, indexing the pattern history table, selecting at least one of a branch history entry and a pattern history table entry as a prediction for the branch instruction, wherein the pattern history table entry is selected as the prediction for the branch instruction in response to the branch history entry being in a state specifying to use the pattern history table entry, comparing a pattern history table accuracy to an accuracy threshold, and in response to the pattern history table accuracy falling below the accuracy threshold, purging the PHT.

20 Claims, 5 Drawing Sheets

METHOD AND SYSTEM FOR PURGING PATTERN HISTORY TABLES AS A FUNCTION OF GLOBAL ACCURACY IN A STATE MACHINE-BASED FILTERED GSHARE BRANCH PREDICTOR

BACKGROUND OF THE INVENTION

This invention relates generally to branch prediction, and more particularly to a method, system and computer product for purging pattern history tables as a function of global accuracy in a state machine-based filter gshare branch predictor.

In designing a hardware mechanism in a microprocessor, the goal is to achieve high branch prediction accuracy while minimizing use of chip area and power consumption in a high frequency design. In computer architecture, a branch predictor is the part of a processor that determines whether a conditional branch in the instruction flow of a program is likely to be taken or not. Branch predictors allow processors to fetch and execute instructions without waiting for a branch to be resolved. One type of branch predictor is the bimodal predictor that has a table of two-bit entries, indexed with the least significant bits of the instruction addresses. The bimodal predictor (2-bit saturating counter) provides high accuracy on most branches, particularly those that are dominant. Dominant branches are those that often exhibit the same direction: taken vs. not-taken. The bimodal predictor often mis-predicts non-dominant branches.

Pattern-based prediction algorithms provide high accuracy on non-dominant branches but are costly in terms of area and power consumption. An effective pattern-based algorithm based on global branch history is gshare. Hybrid predictors allow for the dynamic selection among different predictors. For example, a hybrid predictor can include both a bimodal predictor and a pattern-based predictor such as gshare. A traditional hybrid predictor selects between predictors based on a per-branch indication of which predictor is best.

Global hybrid branch predictors are effective because consecutive branches often benefit from using the same predictor in a hybrid configuration. A global selection counter can be used instead of a per-branch selection table to achieve improved performance over not having one, with less overhead than a traditional hybrid scheme. One global selection counter takes up much less area than a table of them. Each predictor still needs to be big enough to support all branches being tracked. Peak performance with a global selection counter is not as good as that of a traditional hybrid but performance per area is significantly better.

Another approach, state machine based filtering, uses a pattern-based predictor such as gshare only on non-dominant branches, which allows gshare to be implemented with a much smaller pattern history table (PHT) that would otherwise be possible. The prediction state associated with each branch is updated according to a state machine that attempts to recognize those branches which would benefit from the PHT.

However, unlike traditional hybrid approaches, once the decision is made to use the gshare method on a particular branch it continues to be used even if the prediction accuracy of this method is low. Accuracy may be low due to little correlation between global history and branch outcome. Accuracy can drop due to changes in code behavior over time and also due to multiple branches conflicting with one another by using the same PHT entries. It would be desirable to have a mechanism to transition out of the PHT state.

BRIEF SUMMARY OF THE INVENTION

An exemplary embodiment includes a gshare branch predictor method in a microprocessor having a branch history table, a pattern history table and a global history register, the method including storing encountered branch instructions in the branch history table, indexing the branch history table by a branch instruction address, modifying an entry of the branch history table, indexing the pattern history table and selecting a branch history entry or a pattern history table entry as a prediction for the branch instruction.

Another exemplary embodiment includes a branch prediction method, including determining branch predictions in a microprocessor pipeline and selecting a pattern history table or a branch history table to determine the branch predictions.

A further exemplary embodiment includes a microprocessor, including a pattern history table configured to determine branch predictions, a branch history table configured to determine branch predictions in response to an inability of the pattern history table to make branch predictions and a pattern history purge active register configured to activate in response to a pattern history accuracy falling below a predetermined threshold.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides a filtered gshare branch predictor with the ability to transition branches out of the PHT state, back to a bimodal-like state machine, when global PHT prediction accuracy falls below a threshold. An exemplary embodiment includes a mechanism to determine when to purge the PHT and a mechanism to update branch prediction state as a function of a branch's outcome and whether the PHT is being purged. As such, in accordance with an exemplary embodiment, after the BHT entry for a branch transitions into the PHT state, the PHT makes the branch predictions for that branch when the PHT's accuracy is above the threshold. When the PHT accuracy falls below the accuracy threshold, PHT purging occurs. While purging, the BHT transitions out of the PHT state and no further BHT branches are transitioned into the PHT state.

Figure 1:
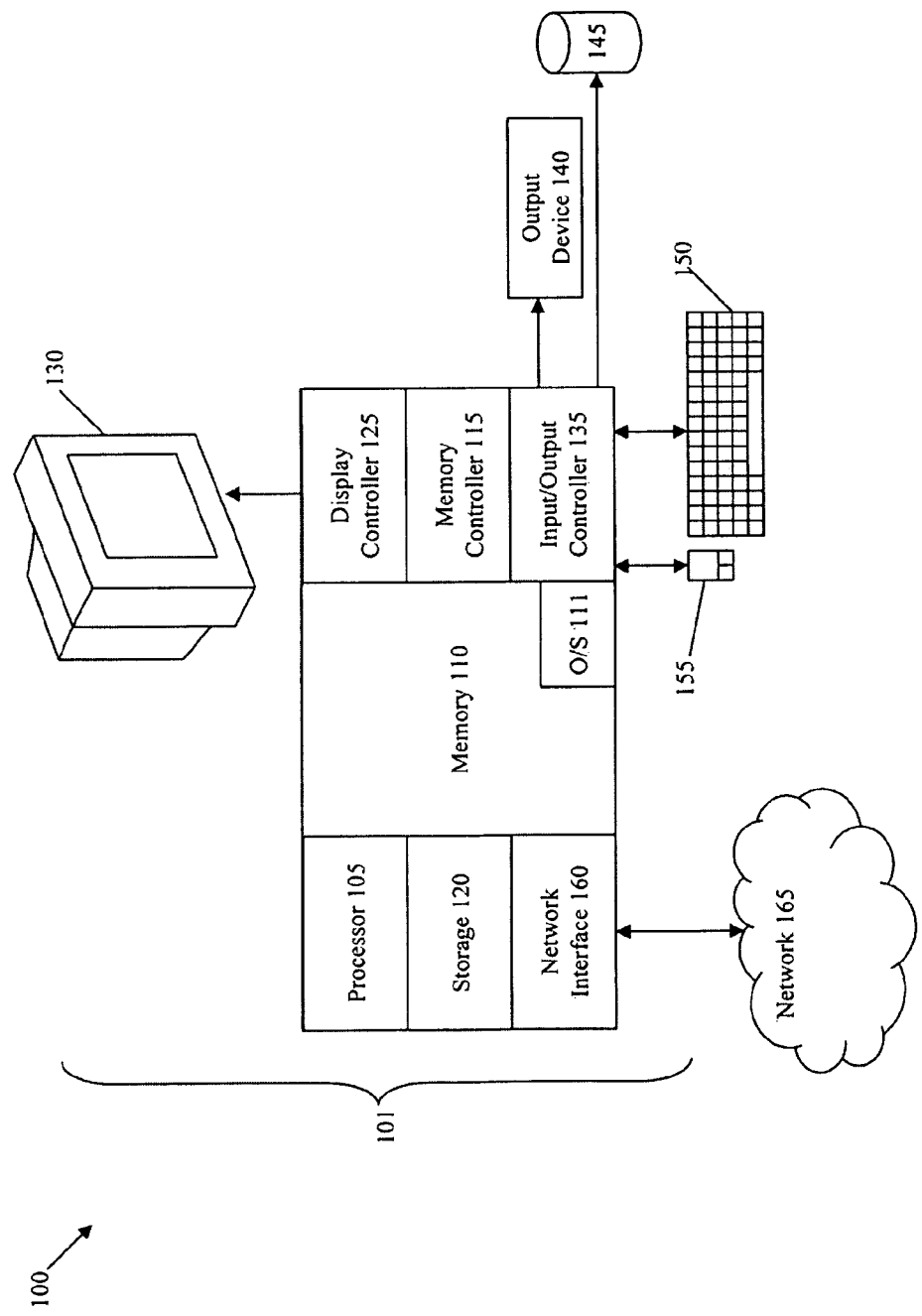
FIG. 1 illustrates a block diagram of a system for purging pattern history tables as a function of global accuracy in a state machine-based filter gshare branch predictor in accordance with an exemplary embodiment.

FIG. 1 illustrates a block diagram of a system 100 for purging pattern history tables as a function of global accuracy in a state machine-based filter gshare branch predictor in accordance with exemplary embodiments. The methods described herein can be implemented in hardware software (e.g., firmware), or a combination thereof. In an exemplary embodiment, the methods described herein are implemented in hardware, and are part of the processor (e.g., a microprocessor) of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing hardware instructions or software instructions (e.g., stored in memory 110). The processor 105 can be any custom made or commercially available processor, a central processing unit (CPU), an auxiliary processor among several processors associated with the computer 101, a semiconductor based microprocessor (in the form of a microchip or chip set), a macroprocessor, a microprocessor, or generally any device for executing instructions.

The memory 110 can include any one or combination of volatile memory elements (e.g., random access memory (RAM, such as dynamic RAM (DRAM), static RAM (SRAM), synchronous dynamic (SDRAM), etc.)) and non-volatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a personal computer (PC), workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions.

In an exemplary embodiment, where the pattern history table purge methods are implemented in hardware, the pattern history table purge methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
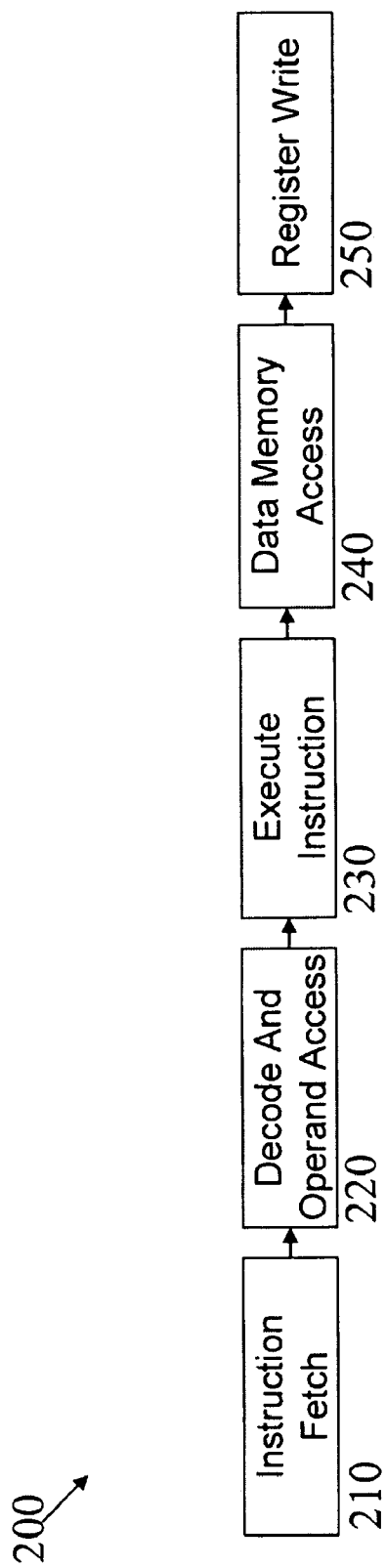
FIG. 2 illustrates a block diagram of a processor instruction pipeline system in which the exemplary pattern history table purge methods can be implemented in accordance with an exemplary embodiment.

FIG. 2 illustrates a block diagram of a processor instruction pipeline system 200 coupled to the processor 105 in which the exemplary pattern history table purge methods can be implemented in accordance with an exemplary embodiment. Pipelining is one specific form of parallelism, where the execution of several instructions can be interleaved on the same hardware. In an exemplary embodiment, the pipeline system includes five stages: (1) Instruction fetch 210; (2) Decode and operand access 220; (3) Execute instruction 230; (4) Data memory access 240; and (5) Register write 250. In an exemplary embodiment, the instruction fetch 210 stage fetches instructions to be processed. The Decode and operand access 220 stage decodes the instruction and gathers the source operands needed by the instruction being processed. The Execute instruction 230 stage performs the function of the instructions that can include arithmetic logic unit (ALU) operations. In an exemplary embodiment, the data memory access 240 stage performs any data memory access functions associated with the instruction. The Write Register write 250 stage writes the appropriate result value into the register file.

Figure 3:
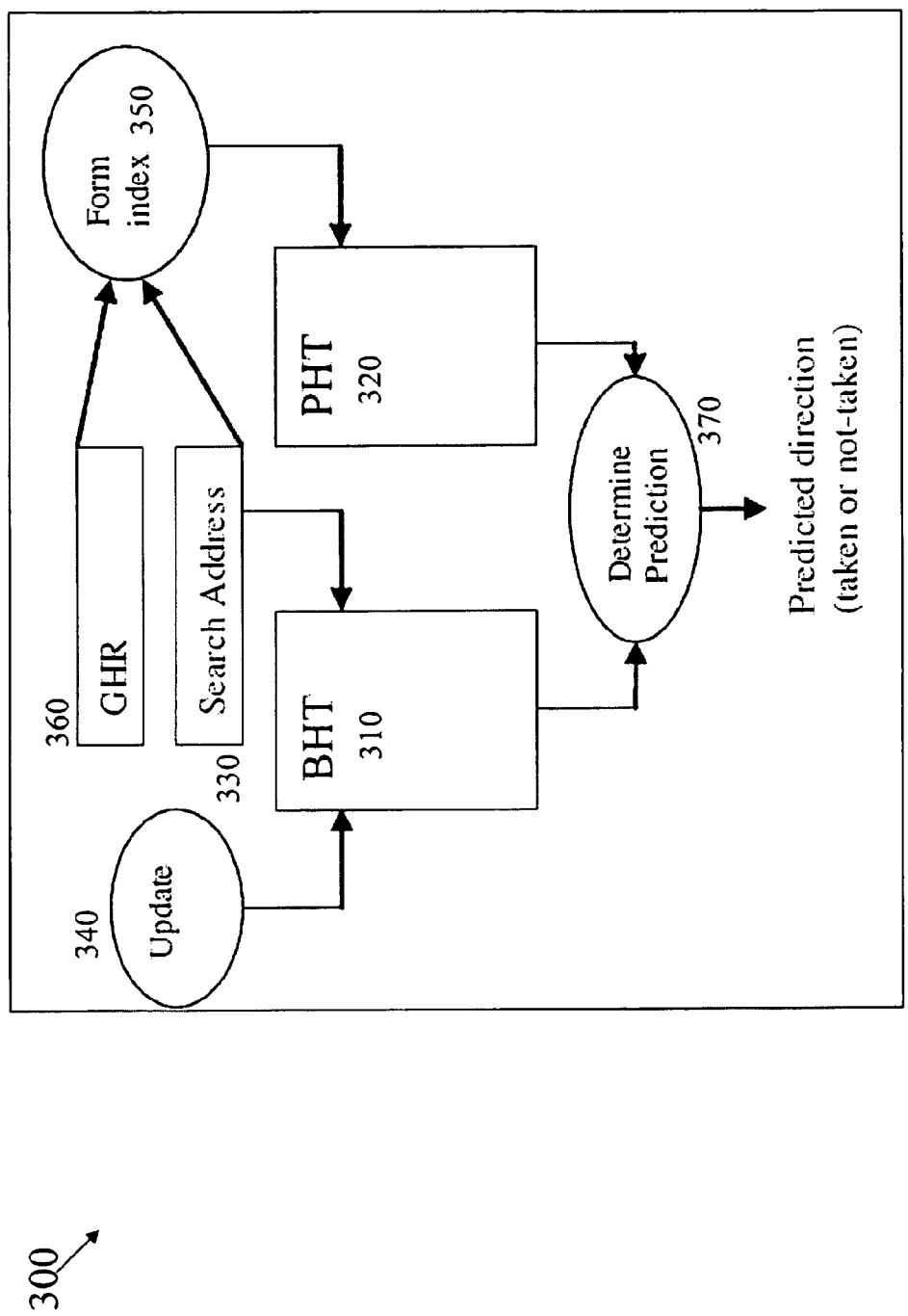
FIG. 3 illustrates a block diagram of a filtered gshare branch predictor flow in accordance with an exemplary embodiment.

FIG. 3 illustrates a block diagram of a filtered gshare branch predictor flow 300 associated with the processor 105 and the pipeline system 200 discussed herein in accordance with an exemplary embodiment. In exemplary embodiment, the gshare branch predictor flow 300 can include a Branch History Table (BHT) 310 and a Pattern History Table (PHT) 320. In an exemplary embodiment, the PHT 320 contains the prediction information about each history pattern and is used to keep prediction information for each specific pattern. In an exemplary embodiment, the BHT 310 maintains a record of recent outcomes for conditional branches (taken or not taken). In an exemplary embodiment, PHT purging is used in the filtered gshare branch predictor flow 300. The BHT 310 stores states associated with previously encountered branch instructions. The BHT 310 is indexed by instruction address 330. Entries in the BHT 310 are installed and updated upon completing branch instructions by an update input 340. A BHT entry is updated according to the BHT state machine as a function of a predicted branch's outcome and whether the PHT 320 is being purged. The BHT state machine is discussed further with respect to FIG. 5 below. In an exemplary embodiment, the PHT 320 is indexed as a function of a Global History Register (GHR) 360 and the search address 330. As illustrated, indexing occurs via a PHT form index 350. In an exemplary embodiment, for the gshare algorithm, the PHT form index 350 is a bitwise exclusive-OR of the GHR with the search address 330. The BHT entry is selected in order to make a branch prediction, which is compared in a determine prediction algorithm. In an exemplary embodiment, if the selected BHT entry is in a state other than "PHT", that BHT state specifies the prediction. When the selected BHT entry is in the "PHT" state, the selected PHT entry specifies the predicted direction.

Figure 4:
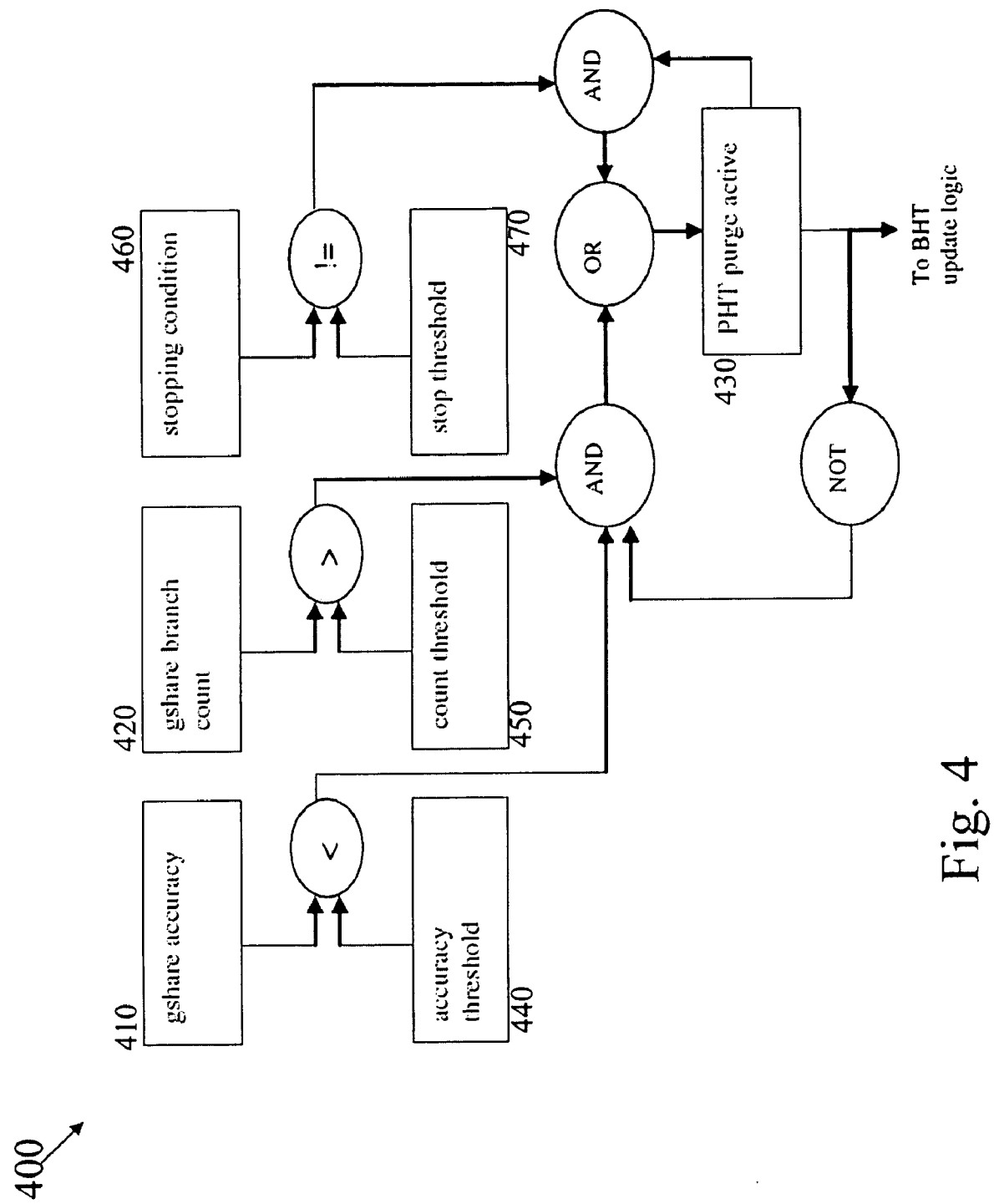
FIG. 4 illustrates a block diagram of a PHT purge determination flow in accordance with an exemplary embodiment.

FIG. 4 illustrates a block diagram of a PHT purge determination flow 400 in accordance with an exemplary embodiment. In an exemplary embodiment, PHT purging is accomplished by monitoring PHT prediction accuracy and removing BHT entries from the PHT state and preventing entries to transition into the PHT state once PHT accuracy drops below a threshold. As now discussed, the PHT purge determination can be implemented via registers and parameters that can either be implemented as fixed values in hardware or as additional programmable registers. In an exemplary embodiment, a gshare accuracy register 410 is an n-bit register that stores the accuracy of a given prediction. The gshare accuracy register 410 is initialized to some parameterized value and is re-initialized to that same value upon completing a PHT purge. Upon completion of each predicted branch that used the PHT 320, the gshare accuracy register 410 is incremented by 1 if the prediction was correct or it is decremented by 1 if the prediction was wrong. In an exemplary embodiment, attempting to increment from a value of $2^n-1$ causes no modification to the gshare accuracy register 410, which is called saturation at $2^n-1$. Likewise, attempting to decrement from a value of 0 causes no modification to the gshare accuracy register 410.

In an exemplary embodiment, an m-bit gshare branch count register 420 tracks how many predicted branches that used the PHT 320 have completed. The m-bit gshare branch count register 420 is initialized to 0 and re-initialized to 0 upon completing a PHT purge operation. The m-bit gshare branch count register 420 is incremented by 1 (saturating at $2^m-1$) every time a PHT-predicted branch completes.

In an exemplary embodiment, a 1-bit PHT purge active register 430 indicating that PHT purging is taking place is set to '1' whenever the gshare accuracy register 410 is less than a parameterized accuracy threshold 440 and the count of completed PHT branches in the gshare branch count register 420 is above a parameterized count threshold 450. This indication of PHT purging is used in the logic that determines how to update BHT entries for predicted branches as discussed with respect to FIG. 3. The BHT state machine is discussed with respect to FIG. 5. In an exemplary embodiment, purging takes place until a stopping condition 460 is met. The stopping condition is compared against the stop threshold 470. Possible stopping conditions include, but are not limited to: the passing of a parameterized number of cycles; the completion of a parameterized number of PHT branches; and the PHT accuracy rising above a parameterized threshold after seeing a parameterized number of PHT branches while purging is active. In an exemplary embodiment, when the stopping condition is met, the PHT purge active 430 register is set to '0' and the gshare accuracy register 410 and gshare branch count register 420 are reset to the initial parameterized values. The PHT purge active register 430 indication modifies transitions of the BHT update state machine as now discussed. This state machine updates the value of a BHT entry upon completion of a corresponding predicted branch.

Figure 5:
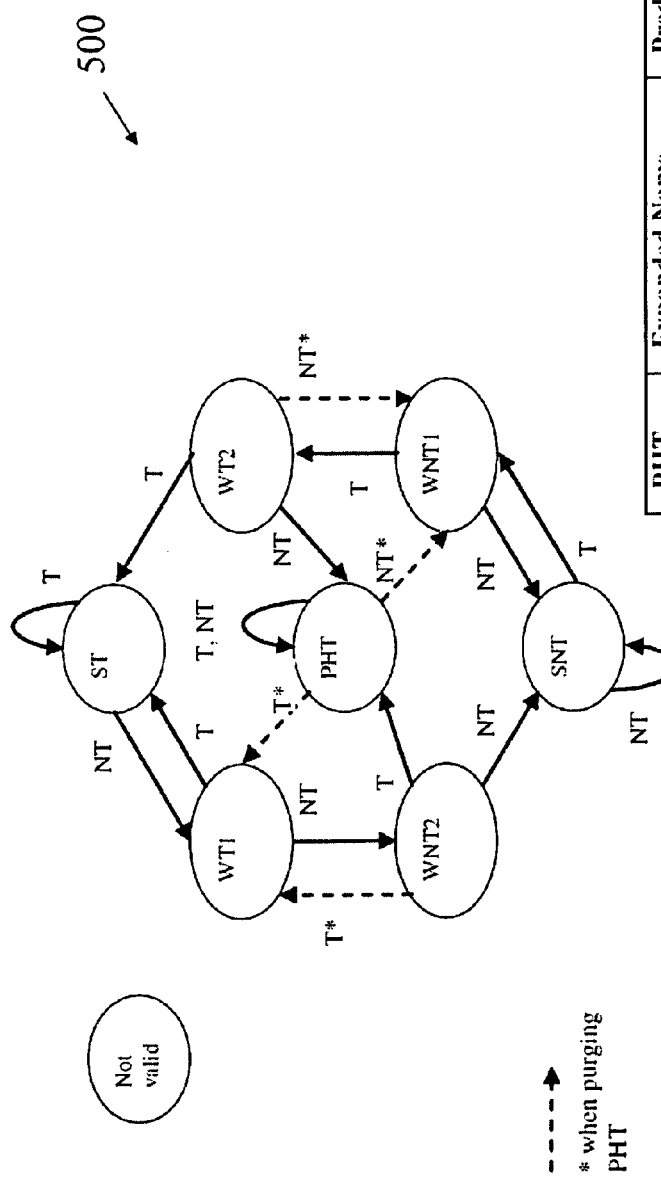
FIG. 5 illustrates a BHT state chart in accordance with an exemplary embodiment.

FIG. 5 illustrates a BHT state chart 500 in accordance with an exemplary embodiment. As discussed above, when a determination is made that the PHT has become inaccurate in branch prediction, PHT purge becomes active, and the BHT determines branch prediction. The BHT state chart 500 illustrates branch prediction states. The solid lines in the BHT state chart 500 occur when the PHT is running accurately. When PHT purge is active, each dashed line in the BHT state chart 500 replaces the corresponding solid line with the same specified transition condition.

Technical effects and benefits include improved branch prediction accuracy. When the PHT accuracy falls below an accuracy threshold, the then more-accurate BHT makes the branch predictions. As the PHT is in a purging state, conflicts are removed from the PHT. When the PHT is used again, it will either be more accurate than the threshold and will continue to be used, or will be less accurate than the threshold and the PHT purge operation will be initiated again.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. In a processor having a branch history table, a pattern history table and a global history register, a branch predictor method, comprising:
    storing a plurality of encountered branch instructions in the branch history table;
    indexing the branch history table by a branch instruction address;
    in response to a completion of a branch instruction, modifying an entry of the branch history table;
    indexing the pattern history table;
    selecting at least one of a branch history entry and a pattern history table entry as a prediction for the branch instruction, wherein the pattern history table entry is selected as the prediction for the branch instruction in response to the branch history entry being in a state specifying to use the pattern history table entry;
    maintaining a parameterized accuracy threshold in a gshare accuracy register;
    maintaining a parameterized count threshold in the gshare accuracy register;
    comparing a pattern history table accuracy to the parameterized accuracy threshold; and
    in response to the pattern history table accuracy falling below the parameterized accuracy threshold, and in response to a count of completed pattern history branches in the gshare branch count register is above the parameterized count threshold, purging the pattern history table by removing branch history table entries from the pattern history table state and preventing branch history table entries from transitioning into the pattern history table state until a stopping condition is met to stop purging the pattern history table, wherein the stopping condition is met in response to a stop threshold,
    wherein the gshare accuracy register is incremented if the pattern history table prediction is correct and is decremented if the pattern history table prediction is incorrect.

2. The method as claimed in claim 1 wherein the accuracy threshold is pre-determined.

3. The method as claimed in claim 1 wherein the accuracy threshold is set by latches initialized by a basic input output system during processor initialization.

4. The method as claimed in claim 3 wherein the pattern history table accuracy is a gshare accuracy.

5. The method as claimed in claim 1 wherein the pattern history table is indexed by combining the value of the global history register with the instruction address, wherein the combination is a logical function including at least an exclusive-OR or concatenation.

6. The method as claimed in claim 1 wherein selecting at least one of a branch history entry and a pattern history table entry as a prediction for the branch instruction comprises:
    decoding the branch history entry; and
    in response to the branch history entry not being the pattern history table state, selecting the branch history entry as the branch prediction.

7. The method as claimed in claim 1 wherein selecting at least one of a branch history entry and a pattern history table entry as a prediction for the branch instruction comprises:
    decoding the branch history; and
    in response to the branch history entry being the pattern history table state, selecting the pattern history entry as the branch prediction.

8. The method as claimed in claim 1 wherein selecting at least one of a branch history entry and a pattern history table entry as a prediction for the branch instruction comprises selecting the branch history entry as the branch prediction in response to an inability of the pattern history table to make an accurate prediction.

9. The method as claimed in claim 8 wherein the inability to make an accurate prediction is determined in response to a pattern history accuracy falling below a pre-determined accuracy threshold.

10. A branch prediction method, comprising:
    determining branch predictions in a microprocessor pipeline;
    selecting at least one of a pattern history table and branch history table to determine the branch predictions, wherein the pattern history table determines branch predictions in response to a pattern table history accuracy remaining above an accuracy threshold; and
    in response to the pattern history table accuracy falling below the accuracy threshold when a value of a gshare accuracy register is less than a parameterized count threshold and if a count of completed pattern history branches in a gshare branch count register is above a parameterized count threshold, purging the pattern history table by removing branch history table entries from the pattern history table state and preventing branch history table entries from transitioning into the pattern history table state until a stopping condition is met to stop the purge operation, wherein the stopping condition is met when the stopping condition equals a stop threshold,
    wherein the gshare accuracy register is incremented if the pattern history table prediction is correct and is decremented if the pattern history table prediction is incorrect.

11. The method as claimed in claim 10 wherein the pattern history table determines the branch predictions in response to a pattern history table accuracy equal to or greater than a predetermined accuracy.

12. The method as claimed in claim 11 wherein the branch history table determines the branch predictions in response to the pattern history table accuracy less than the predetermined threshold.

13. The method as claimed in claim 10 further comprising initiating pattern history purging in response to a pattern history table accuracy falling below a predetermined threshold.

14. The method as claimed in claim 13 wherein the branch history table determines branch predictions in response to pattern history purging.

15. The method as claimed in claim 10 wherein selecting at least one of a pattern history table and branch history table to determine the branch predictions comprises:
    decoding a branch history entry; and
    in response to the branch history entry not being the pattern history table state, selecting the branch history entry as the branch prediction.

16. The method as claimed in claim 10 wherein selecting at least one of a pattern history table and branch history table to determine the branch predictions comprises:
    decoding a branch history entry; and
    in response to the branch history entry being the pattern history table state, selecting the pattern history entry as the branch prediction.

17. A microprocessor, comprising:
a pattern history table configured to determine branch predictions;
a branch history table configured to determine branch predictions in response to an inability of the pattern history table to make branch predictions; and
a pattern history purge active register configured to activate in response to a pattern history accuracy falling below a predetermined threshold
wherein in response to the pattern history table accuracy falling below the accuracy threshold when a value of a gshare accuracy register is less than a parameterized count threshold and if a count of completed pattern history branches in a gshare branch count register is above a parameterized count threshold, purging the pattern history table by removing branch history table entries from the pattern history table state and preventing branch history table entries from transitioning into the pattern history table state until a stopping condition is met to stop the purge operation, wherein the stopping condition is met when the stopping condition equals a stop threshold,
wherein the gshare accuracy register is incremented if the pattern history table prediction is correct and is decremented if the pattern history table prediction is incorrect.

18. The microprocessor as claimed in claim 17 further comprising a global history register, wherein the pattern history table is configured to be indexed by combining the global history register and a search instruction address.

19. The microprocessor as claimed in claim 17 wherein the branch history table is further configured to receive updated branch prediction entries.

20. The microprocessor as claimed in claim 19 wherein branch history entries are updated by comparing the pattern history table accuracy to the predetermined threshold and in response to the pattern history table accuracy falling below the predetermined threshold, transitioning the entry in the branch history table when in the pattern history state out of the pattern history state, and preventing the entry when not in the pattern history state from transitioning into the pattern history state.

* * * * *